United States Patent [19]

Mayerböck et al.

[11] Patent Number: 5,165,669
[45] Date of Patent: Nov. 24, 1992

[54] HYDRAULICALLY DAMPING ELASTOMER BEARING

[75] Inventors: Wilhelm Mayerböck, Wachtberg-Oberbachem; Wolfram Krause, Swisttal-Morenhoven, both of Fed. Rep. of Germany

[73] Assignee: BOGE Aktiengesellschaft, Eitorf, Fed. Rep. of Germany

[21] Appl. No.: 700,720

[22] Filed: May 15, 1991

[30] Foreign Application Priority Data

May 15, 1990 [DE] Fed. Rep. of Germany ....... 4015523

[51] Int. Cl.⁵ .............................................. F16F 13/00
[52] U.S. Cl. .................................. 267/140.12; 267/219
[58] Field of Search ............ 267/140.1 A, 140.1 AE, 267/140.1 R, 140.1 C, 219, 220, 35; 248/550, 636, 562

[56] References Cited

U.S. PATENT DOCUMENTS

| | | | |
|---|---|---|---|
| 4,739,979 | 4/1988 | Kanda | 267/140.1 C |
| 4,858,896 | 8/1989 | Colford | 267/146.1 A |
| 5,040,775 | 8/1991 | Miyakawa | 267/220 |

FOREIGN PATENT DOCUMENTS

| | | |
|---|---|---|
| 3019337 | 11/1981 | Fed. Rep. of Germany . |
| 3343392 | 9/1984 | Fed. Rep. of Germany . |
| 3710629 | 10/1988 | Fed. Rep. of Germany ...... 267/220 |
| 0205503 | 9/1986 | Japan ................................... 267/220 |
| 0079443 | 3/1989 | Japan .......................... 267/140.1 A |

*Primary Examiner*—Matthew C. Graham
*Attorney, Agent, or Firm*—Nils H. Ljungman and Associates

[57] ABSTRACT

A hydraulically damping rubber, elastomer an/or resilient bearing with at least one fastener is provided. The fastener is configured and designed to be fastened to a vehicle body. The bearing includes at least two fluid chambers containing damping fluid. The fluid chambers are located axially one behind the other in the elastomer body of the bearing. The elastomer body of the bearing is, preferably, designed as a one-piece component. A partition is provided in the bearing to separate the fluid chambers. The partition supports a disk and the partition, the disk and the elastomer body define the configuration of the fluid chambers. A ring-shaped element is also, preferably, provided, which at least, defines a fluid flow connection, or passageway, between the fluid chambers.

20 Claims, 8 Drawing Sheets

HYDRAULICALLY DAMPING ELASTOMER BEARING

BACKGROUND OF THE INVENTION

1. Field of the Invention

The present invention relates to a hydraulically damping rubber, elastomer or resilient, bearing. The bearing of the present invention has at least one fastening element, and at least two chambers containing damping fluid. The two chambers are positioned in axial relationship with one another in an elastomer body member. The two chambers are fluidly connected to one another by a flow connection passageway.

2. Background Information

Rubber bearings of this type are known, e.g. German Laid-Open Patent Application No. 30 19 337, and German Laid-Open Patent Application 33 43 392, in which an elastomer body is located between two fastening pieces. The two chambers containing a damping medium are connected to one another by means of a flow connection. One disadvantage of such a design is that the geometric structure of the unit requires several vulcanization processes. Another disadvantage is that appropriate components and seals are necessary to delimit the chambers.

OBJECT OF THE INVENTION

One object of the present invention is to provide a hydraulically damping rubber, resilient or elastomeric bearing that is easy to manufacture whereby an elastomer body can be produced in an appropriate configuration in a single forming process, such as vulcanization.

SUMMARY OF THE INVENTION

To achieve this object, the present invention comprises a bearing having an elastomer body, which body is, preferably, designed as a one-piece component. The bearing includes a partition that separates the fluid chambers, and the partition includes a disk. The partition, the disk, the elastomer body of the bearing and a ring-shaped element cooperate to at least partly define the flow connection or passageway and the fluid chambers.

One advantage of the configuration of the present invention is that the elastomer body is manufactured in a single process, such as a vulcanization process. The assembly of the rubber, resilient or elastomer, bearing is then completed with the subsequent installation of the component having the flow connection passageway and the fastening component. Various embodiments of fastening components may be employed in the present invention. Also, the elements defining the flow connection passageway may have one of a variety of configurations. For example, a flow connection passageway element having a geometrically simple flow connection can be employed, as well as an element with an annularly configured flow passage that is positioned around an axis of the bearing. The flow connection passageway element, along with the partition, also serves to delimit or define the fluid chambers since the partition is positively connected with the flow connection passageway element to form an elastic, or resilient seal. An additional advantage of the present invention is that the partition disk may easily be connected to a force transmission component, and can, thus, facilitate axial movement of the force transmission component.

The present invention provides the additional feature that the partition disk may be covered with an elastomeric substance. Further, the disk may be introduced directly into the partition during the formation, or vulcanization, process.

In a particularly favorable embodiment of the present invention, the elastomer body member is reinforced on at least one end surface with a piece of metal. Such a metal piece, or pieces, in the end surface may be employed to brace the external fastening portion of the bearing if after the insertion of the flow connection passageway element, the tube-shaped external fastening piece is installed in the bearing and then closed at its ends.

To achieve a simple assembly and/or installation of the flow connection passageway element, the element may be designed as a two-piece component.

In another embodiment of the present invention, the geometry or configuration of at least one fluid chamber is designed so that at least one of the chambers forms an axial stop for the partition. The chamber, or chambers, can thereby be separated by some distance from the partition positioned around the circumference, so that the chamber, or chambers, are positioned at an appropriate distance relative to the partition.

The present invention, may also provide fluid chambers that may be somewhat kidney-shaped. Also, the fluid chambers may cover the entire circumference of the bearing.

In one embodiment of the invention, the flanges are designed so that they form a radial stop for the force transmission component.

One aspect of the invention resides broadly in a hydraulically damped bearing comprising: first device for attachment to one of a vibrating body and a substantially still body; second device for attachment to one of a vibrating body and a substantially still body; an elastomer body comprising at least two chamber devices, the at least two chamber devices containing a damping medium, the elastomer body having a circumference; an element having flow passage mechanism, the flow passage mechanism for connecting the at least two chamber devices to one another, the element having flow passage mechanism for being attached to one of the first attachment device and the second attachment device; partition apparatus for separating the at least two chamber devices from one another; a central axis; disk device disposed in the partition apparatus, the disk device for fastening the elastomer body to a force transmission component thereby permitting axial movement of the force transmission component along the central axis; the force transmission component being attached to the second attachment device; and the at least two chamber devices being bound substantially by the elastomer body, the element having flow passage mechanism, and the partition apparatus.

BRIEF DESCRIPTION OF THE DRAWINGS

The following description of the Preferred Embodiments may be better understood when taken in conjunction with the appended drawings in which.

DESCRIPTION OF THE PREFERRED EMBODIMENTS

Figure 1:
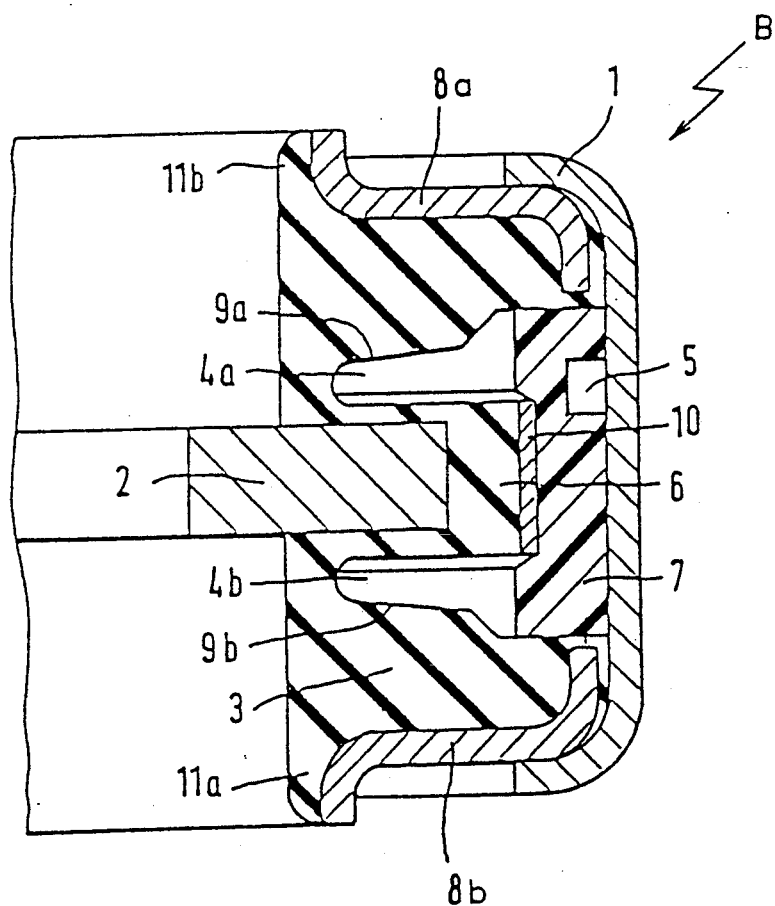
FIG. 1 is a side elevational view of a cross-sectional portion of the bearing of the present invention.
Figure 1A:
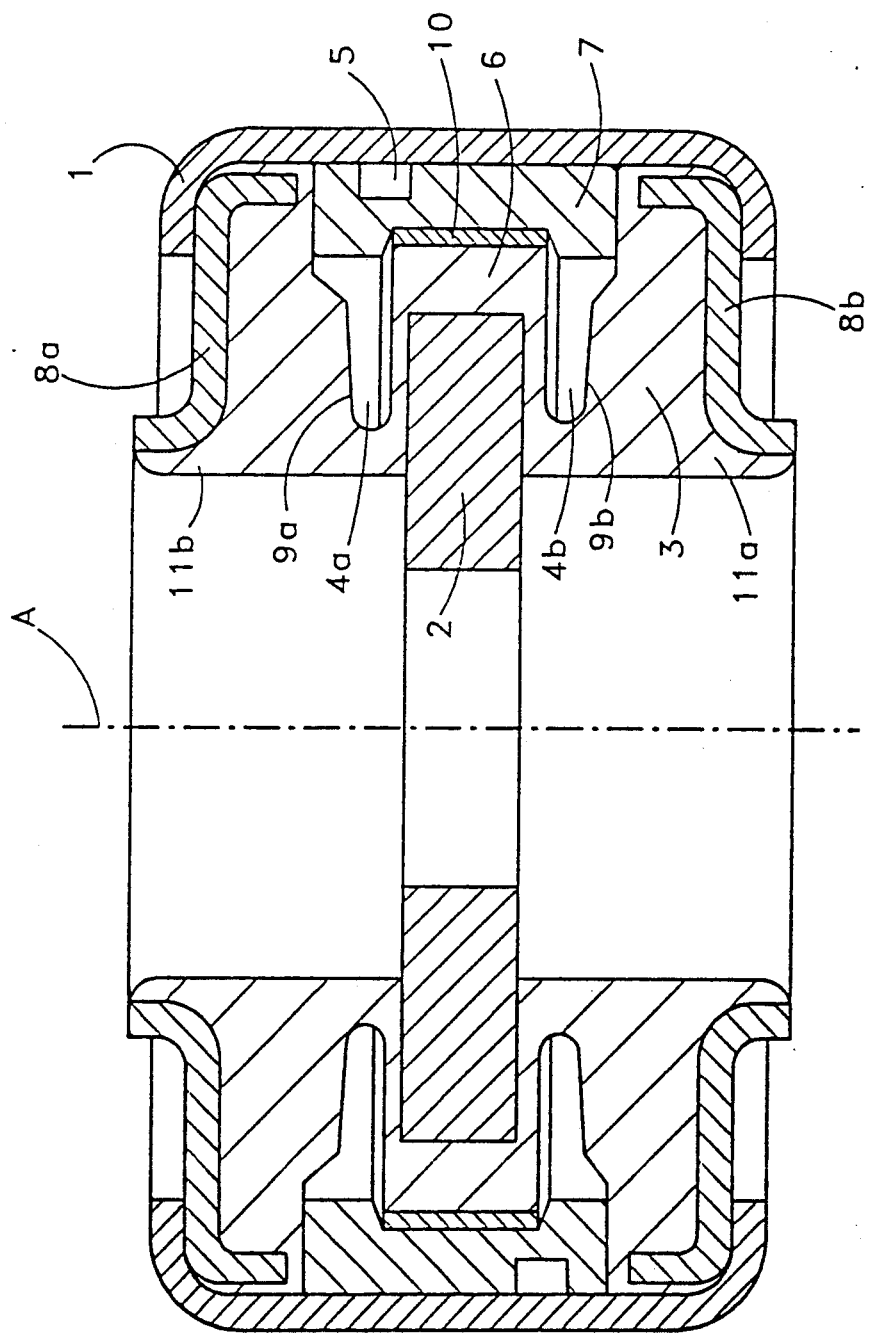
FIG. 1A is a side elevational view of a cross-section of the bearing of the present invention, partially shown in FIG. 1, further showing the central axis.
Figure 2:
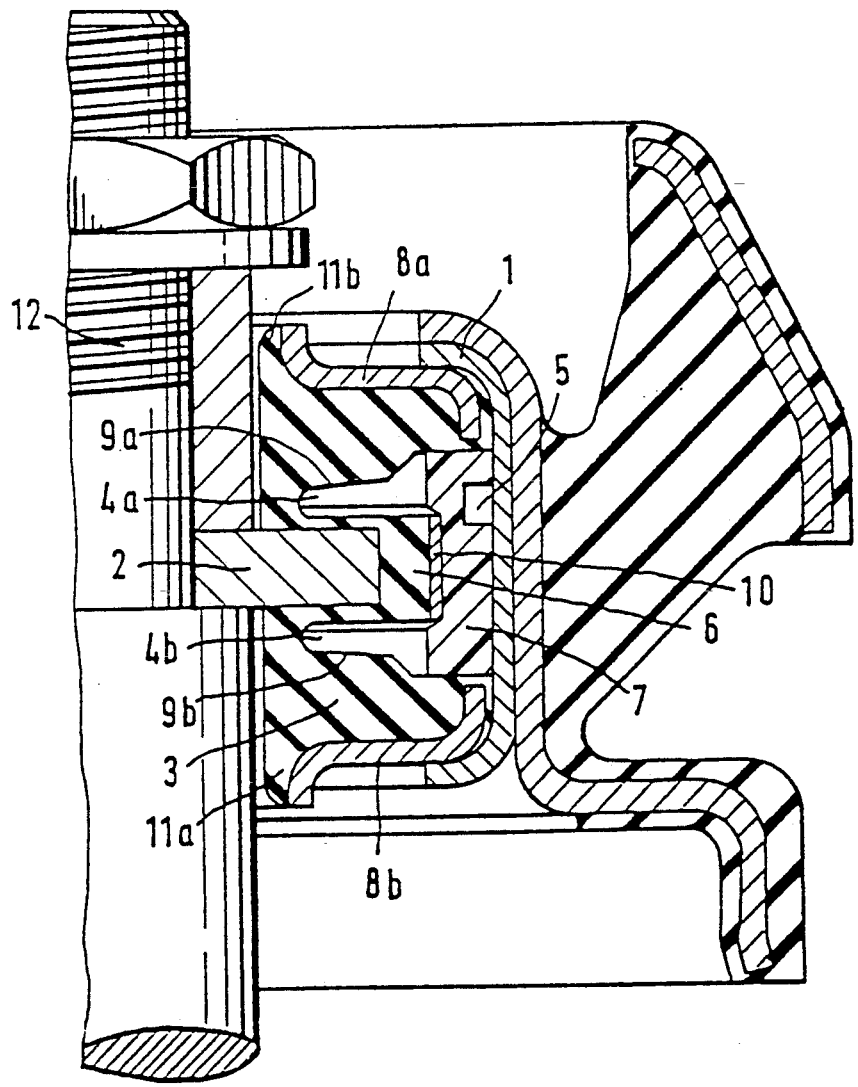
FIG. 2 is a side elevational view of a cross-sectional portion of the bearing of the present invention, shown in FIG. 1, in a housing.
Figure 2A:
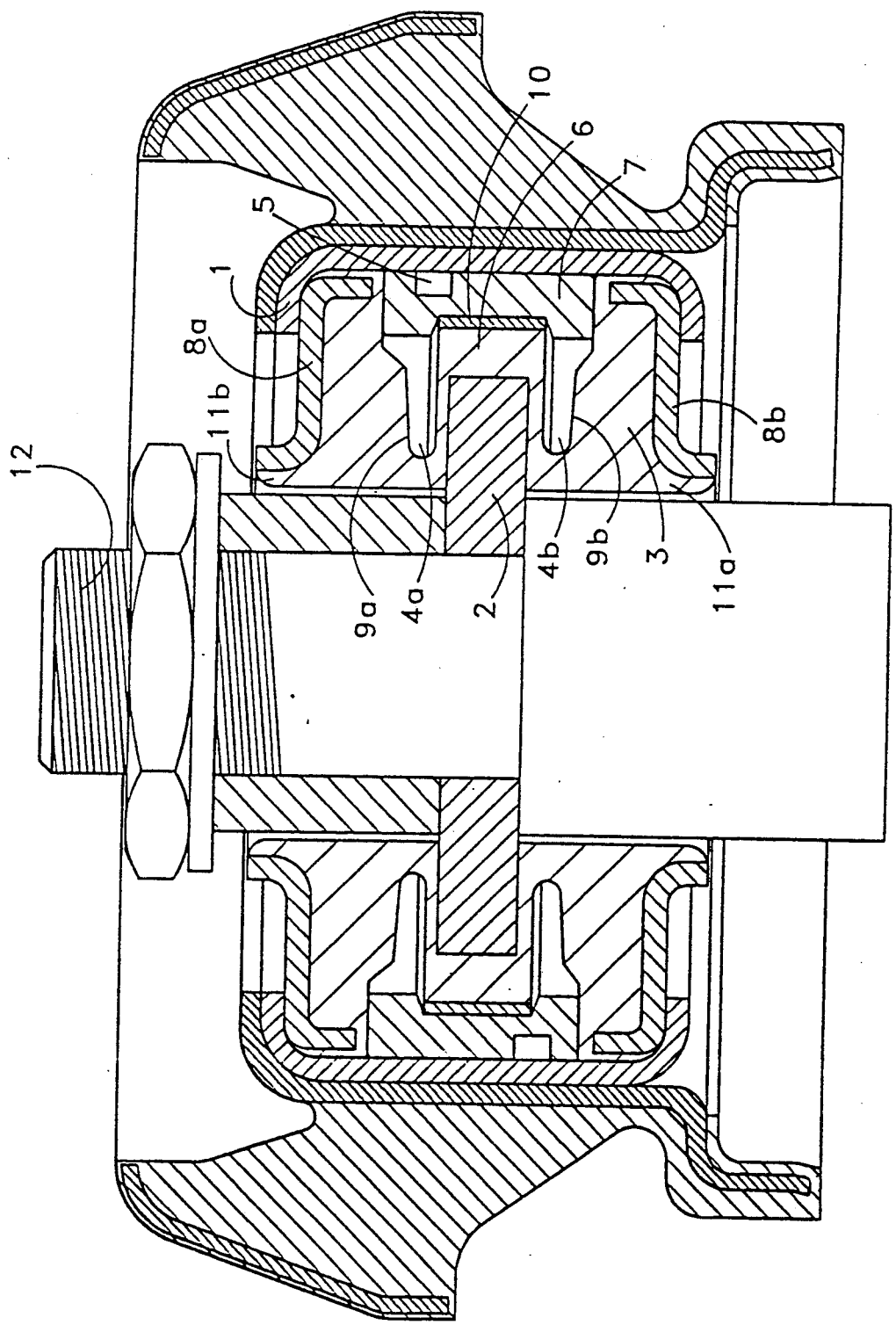
FIG. 2A is a side elevational view of a cross-section of the bearing of the present invention, shown in FIG. 1A, in a housing.
Figure 3:
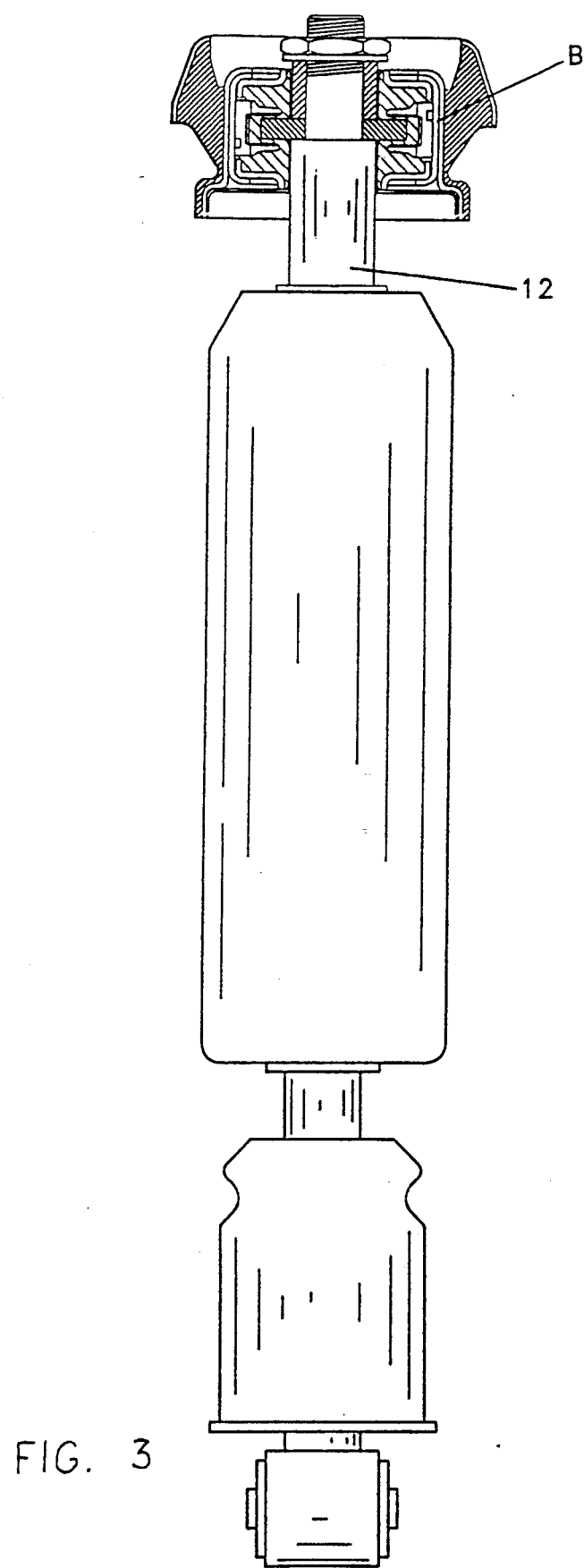
FIG. 3 is a strut showing the possible location of the bearing of the present invention, shown in FIG. 1A.

FIGS. 1, 1A, 2, and 2A show a cross-sectional portion of a hydraulically damping rubber, resilient and/or elastomer bearing B. Bearing B includes, preferably, a one-piece elastomer body 3. Bearing B also includes partition 6 and disk 2. Disk 2 is, preferably, vulcanized to partition 6. Metal reinforcement pieces 8a and 8b may also be vulcanized to the terminal regions of elastomer body 3. Disk 2 is employed for fastening bearing B to a force transmission component, as shown in FIGS. 2, 2A, and 3. Another portion of bearing B may be employed for attaching bearing B to another object such as a vehicle body. Metal pieces 8a and 8b may be in locked engagement with external fastening piece 1. Element 7 is preferably positioned as shown prior to the mutual locking of external fastening piece 1 to metal pieces 8a and 8b so that chambers 4a and 4b are properly formed and defined by the element 7, elastomer body 3 and partition 6. Element 7, which may be ring-shaped, defines flow connection, or flow passageway, 5. Flow connection 5 fluidly connects chambers 4a and 4b with one another and also assists in the throttling of the damping medium between chambers 4a and 4b.

The flow connection, or passageway, 5 can be constructed in a simple geometric configuration. An additional flow connection, or passageway, may run, or be configured, in annular fashion around an axis of symmetry of bearing B, such as central axis A, as shown in FIGS. 1A and 2A. Also, flow connection, or passageway 5 may run, or be configured, in an annular fashion around the axis of symmetry of bearing B.

Partition 6 may be connected to element 7 under a prestress to form a seal. Ring 10 which may be plastic or metal, may be inserted to reduce wear of element 7 and/or partition 6.

The separations, between stop surface 9a and partition 6 and between stop surface 9b and partition 6 in the axially inner region of bearing B, are relatively small so that partition 6 and stop surfaces 9a and 9b can cooperate to form a stop for partition 6 as partition 6 moves axially in either direction.

Flanges 11a and 11b of elastomer body 3 may provide a radial stop for the force transmission component. Flanges 11a and 11b, thus, may act to limit the amount of movement of the force transmission component in directions transverse to the central axis A.

FIGS. 2 and 2A show another possible embodiment of the bearing B, in which the bearing B is disposed in a housing, and also showing a force transmission component, or piston 12.

FIG. 3 shows a possible location of the bearing B in a strut. One possible use for the bearing B is to function as a support bearing for the strut.

Figure 4:
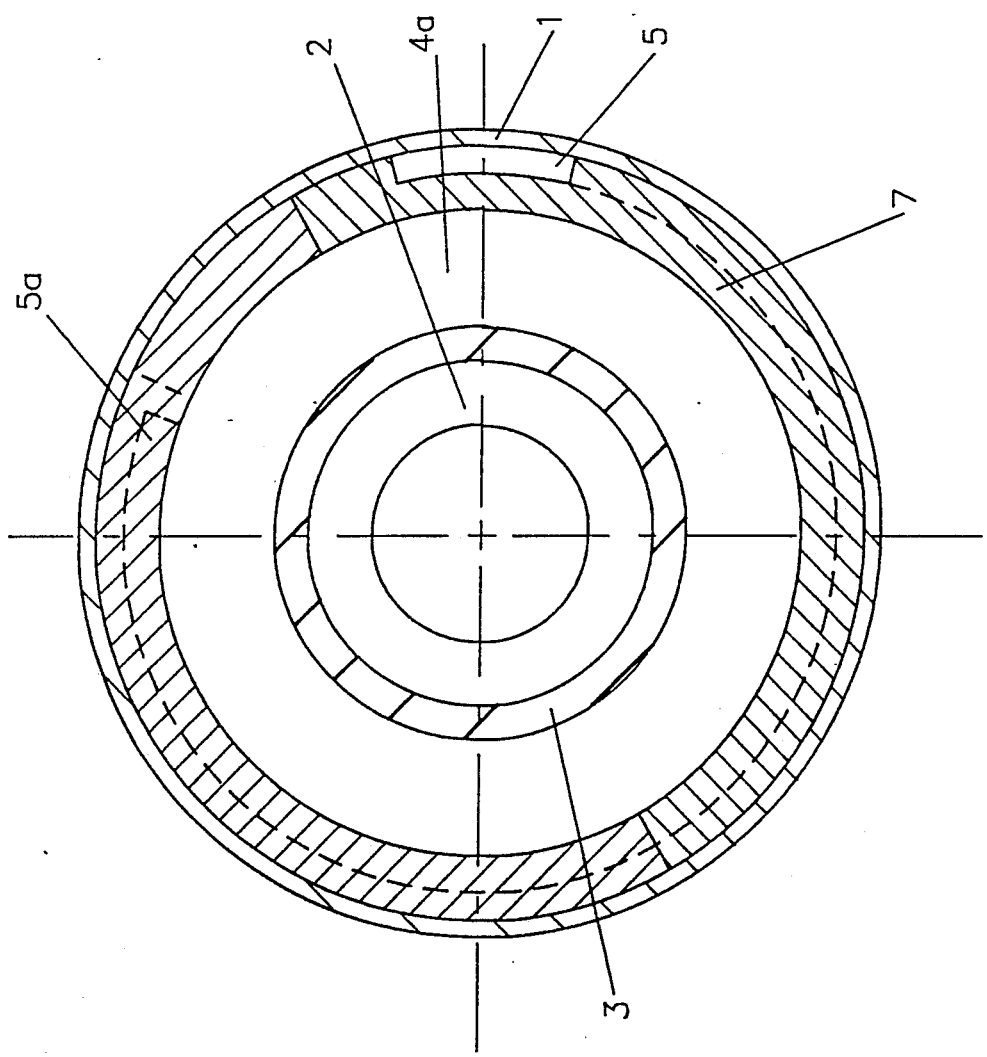
FIG. 4 is a cross-section of the bearing shown in FIG. 1A, taken along lines IV—IV.

FIG. 4 is a cross-section of the embodiment of the bearing shown in 1A, wherein the manner in which chamber 4a substantially encircles the elastomer body 3 is visible. Chamber 4a substantially covers the circumference of the elastomer body 3. The substantially spiral or circular path of flow connection 5 is indicated by the hidden dotted lines. In one possible embodiment, flow passage 5 is substantially annular, and connects chamber 4a to chamber 4b at a position 5a.

Figure 4A:
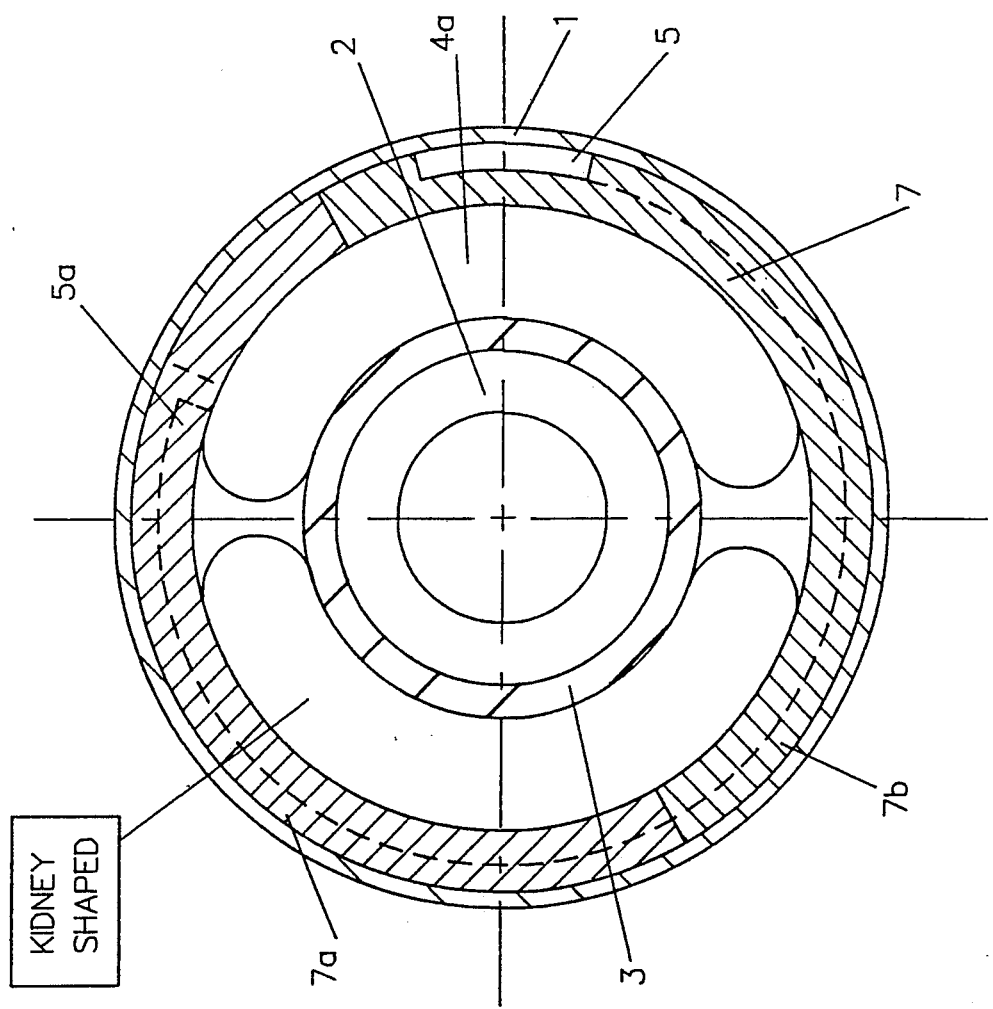
FIG. 4A is the cross-section of the bearing of FIG. 4, showing additional structures.

A possible embodiment of the invention in which element 7 comprises two pieces 7a and 7b, is shown in FIG. 4A. FIG. 4A also shows an alternative shape for chambers 4a and 4b, that shape being reniform or kidney-like.

A possible example of a kidney-shaped chamber may be found in U.S. Pat. No. 4,588,174, issued May 13, 1986, entitled, "Fluid-Filled Resilient Bearing," which is hereby incorporated by reference herein as if set forth in its entirety.

Figure 5:
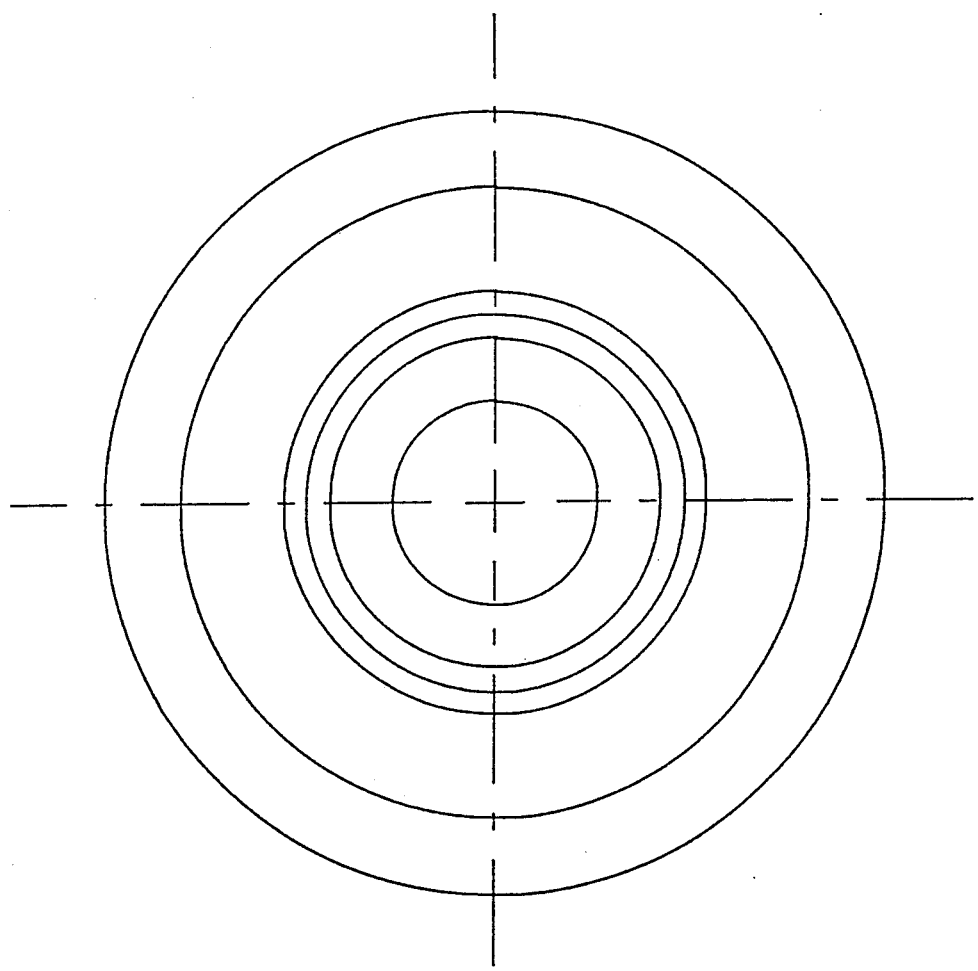
FIG. 5 is a top view of the bearing shown in FIG. 1.

FIG. 5 is a cross-section of the bearing of FIG. 1.

One aspect of the invention resides broadly in a hydraulically damping rubber bearing with at least one fastening piece, and at least two chambers containing damping fluid located axially one behind the other in an elastomer body, whereby the chambers are connected to one another by means of a flow connection, characterized by the fact that the elastomer body 3 is designed as a one-piece component and the partition 6 separating the chambers 4a, 4b contains a disk 2 for fastening the vibration damper to a piston rod 12, and that together with the partition 6 and the elastomer body 3, a ring-shaped element 7 at least partly containing the flow connection 5 delimits the chambers 4a, 4b.

Another aspect of the invention resides broadly in a bearing characterized by the fact that the disk 2 of the partition 6 is covered with elastomer.

Yet another aspect of the invention resides broadly in a bearing characterized by the fact that the disk 2 can be connected to a force transmission component.

Still another aspect of the invention resides broadly in a bearing characterized by the fact that the elastomer body 3 is reinforced on at least one end surface with a metal piece 8.

Still yet another aspect of the invention resides broadly in a bearing characterized by the fact that the element 7 is designed as a two-piece component.

A further aspect of the invention resides broadly in a bearing characterized by the fact that the element 7 has a flow connection 5 running in annular fashion around the bearing axis.

A still further aspect of the invention resides broadly in a bearing characterized by the at least one end of a fastening piece 1 is positively connected to the elastomer body 3.

A yet further aspect of the invention resides broadly in a bearing characterized by the fact that the geometry of the chambers 4a, 4b is designed so that they form an axial stop 9a, 9b for the partition.

A still yet further aspect of the invention resides broadly in a bearing characterized by the fact that the chambers 4a, 4b are kidney-shaped, or reniform, or run over the entire circumference.

A yet still further aspect of the invention resides broadly in a bearing characterized by the fact that the flanges 11a and 11b are designed so that they form a radial stop for the force transmission component.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A hydraulically damped bearing comprising:
   first means for attachment to one of a vibrating body and another body;
   second means for attachment to one of said vibrating body and said another body;
   an elastomer body configured as a one-piece component comprising at least two chamber means and partition means, said partition means for partially separating and delimiting said at least two chambered means from one another, said at least two chamber means containing a damping medium;
   an element having flow passage means, said flow passage means for connecting said at least two chamber means to one another;
   a central axis;
   disk means disposed in said partition means, said disk means comprising means for transmitting forces between said elastomer body and one of said vibrating body and said another body thereby damping axial movement of one of said vibrating body and said another body along said central axis;
   said at least two chamber means being bounded substantially by said elastomer body and its partition means, and said element.

2. A hydraulically damped bearing, according to claim 1, wherein:
   said second means for attachment comprises said disk means;
   said disk means comprises a disk; and
   said disk comprises an inner portion disposed towards said central axis, said disk is partially disposed in said partition means.

3. A hydraulically damped bearing, according to claim 2, wherein said inner portion of said disk partially extends into said central axis in such a way that said disk is attachable to one of said vibrating body and said another body.

4. A hydraulically damped bearing, according to claim 3, wherein said flow passage means is at least partly disposed in said element.

5. A hydraulically damped bearing, according to claim 4, wherein said element is substantially annular.

6. A hydraulically damped bearing, according to claim 5, wherein said substantially annular element has opposite concentric faces, one face being attached to the partition means and one face being attached to one of said first attachment means and said second attachment means.

7. A hydraulically damped bearing, according to claim 6, wherein:
said elastomer body has inner and outer sides, with the inner side disposed concentrically around said central axis and the outer side disposed radially and outwardly from said central axis;
said first means for attachment to one of said vibrating body and said another body is an external fastening piece disposed adjacent to the outer side of said elastomer body;
said element is disposed radially and outwardly from said central axis and said element is disposed between said partition means and said external fastening piece; and
said partition means is disposed directly between said at least two chamber means.

8. A hydraulically damped bearing, according to claim 7, wherein disk is substantially covered by an elastomer.

9. A hydraulically damped bearing, according to claim 8, further comprising reinforcement means disposed on at least one end surface of said elastomer body, said reinforcement means for reinforcing said elastomer body.

10. A hydraulically damped bearing, according to claim 9, wherein said reinforcement means are made of metal.

11. A hydraulically damped bearing, according to claim 10, wherein said element is comprised of at least two pieces.

12. A hydraulically damped bearing, according to claim 11, wherein said flow passage means has an annular shape.

13. A hydraulically damped bearing, according to claim 12, wherein said flow passage means encircles said central axis.

14. A hydraulically damped bearing, according to claim 13, further comprising stopping means disposed in at least one of said at least two chamber means, said stopping means being for stopping axial movement of said partition means.

15. A hydraulically damped bearing, according to claim 14, wherein at least one of said at least two chamber means is one of:
substantially kidney-shaped; and
disposed to cover substantially all of said outer side of said elastomer body.

16. A hydraulically damped bearing, according to claim 15, wherein one of said at least two chamber means is disposed axially behind the other of said at least two chamber means.

17. A hydraulically damped bearing, according to claim 16, wherein said elastomer body is vulcanized.

18. A hydraulically damped bearing, according to claim 17, further comprising means for reducing wear disposed between said partition means and said element, and said wear reducing means is comprised of at least one of: metal and plastic.

19. A hydraulically damped bearing, according to claim 18, wherein:
said bearing comprises flange means for forming a radial stop for said means for transmitting forces; and
said means for transmitting forces comprises a piston rod.

20. A hydraulically damped bearing, according to claim 19, wherein said flow passage means has a spiral shape.

* * * * *